(12) United States Patent
Olszak et al.

(10) Patent No.: US 8,956,099 B2
(45) Date of Patent: Feb. 17, 2015

(54) RACK-SERVING UNIT AND ORDER-PICKING WAREHOUSE

(71) Applicant: Krones AG, Neutraubling (DE)

(72) Inventors: Tilo Olszak, Munich (DE); Peter Tiebel, Bad Abbach (DE)

(73) Assignee: Krones AG, Neutraubling (DE)

( * ) Notice: Subject to any disclaimer, the term of this patent is extended or adjusted under 35 U.S.C. 154(b) by 168 days.

(21) Appl. No.: 13/650,331

(22) Filed: Oct. 12, 2012

(65) Prior Publication Data

US 2013/0094926 A1  Apr. 18, 2013

(30) Foreign Application Priority Data

Oct. 14, 2011  (DE) .......................... 10 2011 084 551

(51) Int. Cl.
*B65G 1/04* (2006.01)
*B66F 9/07* (2006.01)
*B66F 9/14* (2006.01)
*B66F 9/18* (2006.01)

(52) U.S. Cl.
CPC . *B66F 9/07* (2013.01); *B66F 9/141* (2013.01); *B66F 9/183* (2013.01); *B65G 1/0435* (2013.01)
USPC ............ 414/281; 414/280; 414/282; 414/277

(58) Field of Classification Search
CPC ............................... B65G 1/0435; B66F 9/07
USPC .......................... 414/277, 279, 280, 281, 282
See application file for complete search history.

(56) References Cited

U.S. PATENT DOCUMENTS

| | | | |
|---|---|---|---|
| 493,542 A | | 3/1893 | Bessing |
| 3,817,406 A | * | 6/1974 | Sawada et al. ................. 414/279 |
| 6,824,345 B2 | * | 11/2004 | Hansl et al. .................... 414/282 |
| 6,923,612 B2 | * | 8/2005 | Hansl ............................. 414/277 |

(Continued)

FOREIGN PATENT DOCUMENTS

| | | |
|---|---|---|
| DE | 68459 C | 8/1969 |
| DE | 2808922 A1 | 9/1979 |

(Continued)

OTHER PUBLICATIONS

German Search Report for 102011084551.8, dated Aug. 21, 2012.

(Continued)

*Primary Examiner* — Kaitlin Joerger
(74) *Attorney, Agent, or Firm* — Marshall, Gerstein & Borun LLP

(57) ABSTRACT

A rack-serving unit for storing boxes having an open box bottom, including a load pick-up device and at least one substantially horizontally telescopic article transport gripper including at least one rest for the articles for gripping under an article, is provided with a single telescopic gripper pin serving as article transport gripper and having a rest for the articles for gripping under the article in a just unstable position and at least one telescopic flank and/or a telescopic hold-down device for setting a stable transport position of the gripped article. In an order-picking warehouse equipped with said rack-serving unit having storing boxes with bottoms which are open in the center thereof, the telescopic gripper pin includes a rest for the articles of a width which is transverse to the telescoping direction for supporting the article in a just unstable position on the rest for the articles and the box bottom opening being just slightly broader than the width.

15 Claims, 4 Drawing Sheets

(56) References Cited

U.S. PATENT DOCUMENTS

| | | | |
|---|---|---|---|
| 7,128,521 B2 * | 10/2006 | Hansl | 414/807 |
| 7,784,407 B2 * | 8/2010 | Di Rosa et al. | 104/48 |
| 8,465,243 B2 * | 6/2013 | van Ooyen et al. | 414/281 |
| 2004/0042880 A1 | 3/2004 | Lee | |
| 2006/0245862 A1 * | 11/2006 | Hansl et al. | 414/281 |
| 2007/0140817 A1 | 6/2007 | Hansl | |
| 2009/0136331 A1 * | 5/2009 | Muser | 414/529 |
| 2011/0008138 A1 * | 1/2011 | Yamashita | 414/277 |
| 2014/0072392 A1 * | 3/2014 | Tanahashi | 414/277 |

FOREIGN PATENT DOCUMENTS

| | | | |
|---|---|---|---|
| DE | 3020791 | A1 | 12/1981 |
| DE | 3312609 | A1 | 10/1984 |
| DE | 9413114 | U1 | 11/1994 |
| DE | 4031883 | A1 | 6/1998 |
| DE | 20206372 | U1 | 8/2002 |
| DE | 20303376 | U1 | 5/2003 |
| DE | 102006025938 | A1 | 12/2007 |
| GB | 1200189 | A | 7/1970 |
| GB | 1243883 | A | 8/1971 |
| GB | 1254387 | A | 11/1971 |
| JP | 8175609 | A | 7/1996 |
| WO | WO-2005061363 | A3 | 11/2005 |
| WO | WO-2009000302 | A1 | 12/2008 |
| WO | WO-2011006247 | A1 | 1/2011 |

OTHER PUBLICATIONS

European Search Report EP12173597 dated Dec. 20, 2012.

* cited by examiner

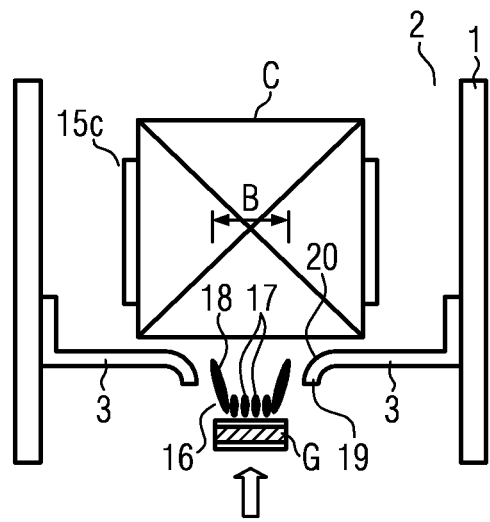
FIG. 9
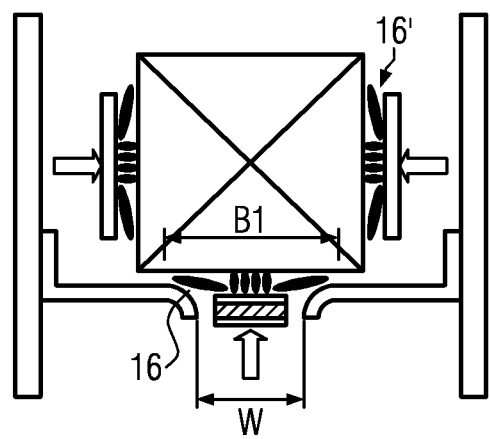
FIG. 10
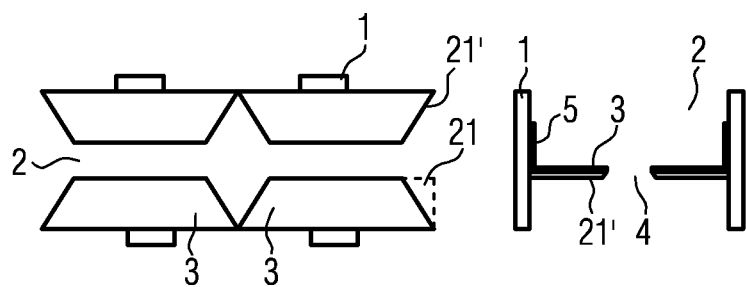
FIG. 11
FIG. 12

RACK-SERVING UNIT AND ORDER-PICKING WAREHOUSE

CROSS-REFERENCE TO RELATED APPLICATION

The present application claims the benefit of priority of German Application No.102011084551.8, filed Oct. 14, 2011 for all subject matter commonly disclosed therein. The text of the priority application is incorporated herein by reference in its entirety.

FIELD OF THE DISCLOSURE

The disclosure relates to a rack-serving unit and to an order-picking warehouse.

BACKGROUND

In order-picking stores or systems as known from practice, the rack-serving unit is moving either fully- or semi-automatically into rack or rack aisles, wherein the storing boxes or compartments are of a depth of simple to multiple dimensions of the articles to be held in stock. The rack-serving unit loads articles into predetermined storing boxes and retrieves articles therefrom, for instance articles ordered for individual order-picking in order to deliver these articles to peripheral conveying units. The known rack-serving units widely correspond to conventional robots and just differ from these with regard to technical specifications such as degrees of freedom, working radius and space and kinematics. Handling articles is becoming more and more complicated when the packages or handling units by which the articles are made available are too many-faceted and too sensitive and no transport or loading facilities such as shelves, boxes, trays etc. are to be used. It is difficult or almost impossible to develop rack-serving units for handling more than e.g. 50 forms of packages and/or for being adaptable to the changes in design and shape of the packages. In such cases, a gripper changing system is usually used for robots with small working space. However, owing to the large working space and the bulk of the load pick-up device, this is hardly possible for rack-serving units. In practice, automatic order-picking warehouses without load pick-up device presently can only deal with packets, i.e. only packages with smooth, stable surfaces and a square shape can be managed. Furthermore, the coefficients of sliding and static frictions of the packages have to be low in order to enable the rack-serving unit to handle such packages by means of the load pick-up device in a technically comprehensible semi- or fully-automatic manner.

From experience, a rack-serving unit with the product labeling BEELAG of the Beewen Company and including a load pick-up device has been known, whose fork-like load transport gripper includes two parallel belt conveyors transversely spaced with regard to the telescoping direction and being telescopic relative to the load pick-up device towards one side of said load pick-up device until they are positioned below the opening of the bottom of the box, load the articles lying thereon at the lower side thereof and pull out these articles from the storing box and place them on stationary belt conveyors of the load pick-up device. As each of the article transport grippers can either be moved in or out at only one side of the load pick-up device, another article transport gripper that can be telescoped in the opposite direction is required for serving or operating storing boxes provided on the opposite side. The two belt conveyors of each of the article transport grippers are spaced apart from each other such that the loaded or grasped articles may assume a stable position thereon when being transported either into or out of the storing box. However, the space between the belt conveyors accounts for an extremely wide opening of the box bottom so that the box bottom is merely defined by narrow blades provided on both sides. That is why the articles can only be handled by means of loading equipment (paperboard, containers or trays, or the like), thus entailing undesired large additional efforts and diminishing the order-picking warehouse capacity.

SUMMARY OF THE DISCLOSURE

The present disclosure concerns a rack-serving unit or an order-picking warehouse for handling articles without loading equipment even in cases where a plurality of articles are being handled at one go. One aspect of the disclosure is to handle a variety of different packaging or package categories, in particular for beverages, without modifying the rack-serving unit and without any further loading equipment being required, for instance such as tetra-packs in half-open paperboard containers of 12, bottle six-packs welded together with a foil, paperboards with wine bottles, PET-bottle packages of 8 2-COKE™ packs with integrated self-supporting rigid plastic tray, FRIDGE MATE™ packages in the form of longitudinal paperboards with a double row of about 12 beverage cans, conventional returnable beer crates, conventional returnable beverage crates in general, packages including cans or jars of tinned food in an open paperboard carrier or the like.

According to the present disclosure, and as illustrated in the drawing Figures, in addition to the transport function in the telescoping direction, a telescopic gripper pin is provided which fulfills a supporting function by means of the narrow rest or support for articles; both being stabilized by the assistance of either the telescopic flanks and/or the telescopic hold-down device either from the sides and/or from above. Due to its narrow rest for articles, the telescopic gripper pin is suitable for handling a large variety of different packaging and package categories, coupled with the decisive advantage of a narrow box bottom opening of a storing box which receives the articles in a stable manner without the assistance of any loading equipment. Any article motion in the telescoping direction is conducted together with the telescopic gripper pin and the telescopic flank/s ensuring the stable transport position and/or the hold-down device, respectively. When operating, the rack-serving unit can quickly handle an article or a number of articles or packages at a time and without being assisted by any loading equipment, with no laborious or complex constructions being provided either at the storing box or at the rack, and is able to deal with a plurality of e.g. beverage packages which are only restricted by the width of the box bottom opening. As no loading equipment is necessary, also no additional conveyor technique for returning the loading equipment is being required.

To this end, the load pick-up device comprises on both sides of the telescopic gripper pin, preferably even with lateral spaces separated from the telescopic gripper pin, parallel belt or band conveyors, wherein one or a plurality of the belt or band conveyors can each be driven in the telescoping direction either individually or in a coupled manner and, where applicable, are positioned one after the other. A reasonable number of consecutively arranged belt or band conveyors corresponds to the number of articles which are consecutively stored in the rack and can be handled by the telescopic gripper pin at one go. Each of the articles will find a stable position on the belt conveyors. Furthermore, if need be, such belt or band conveyors assist the telescopic gripper pin during the last or the first phase of motion while removing or entering articles. One or more of the belt or band conveyors consecutively arranged in the telescoping direction at each side of the telescopic gripper pin allow that one or more articles can temporarily be stored or stacked on the load pick-up device. Beyond that, such belt or band conveyors can be used to convey articles to peripheral conveyor equipment during order-picking or stockpiling.

The order-picking warehouse, which can be used without loading equipment for most diverse forms of packages or articles, comprises e.g. simple high racks including storing boxes with very small box bottom openings, thus allowing a high technical degree of freedom in the rack construction, i.e. also any box depth which merely depends on the physical capability of the telescopic gripper pin. The order-picking warehouse allows for rapid and trouble-free stockpiling and individual order-picking of ordered articles upon transmittal to peripheral conveying and order-picking devices.

A rack-serving unit can move horizontally in a rack aisle, thus operating a rack level or, for many applications, a plurality of rack levels. A vertical movement is performed substantially by means of a lifting device which can be moved vertically along the rack-serving unit. The lifting device can be provided with one or a plurality of load pick-up devices serving, as in case of the present disclosure, for receiving and storing the articles to be transported, on the one hand, and, on the other hand, for storing the articles on the rack-serving unit in a stable manner. Receiving and storing is done by means of the telescopic gripper pin and the telescopic flank/s and/or the hold-down device ensuring a stable transport position. Stable positioning on the rack-serving unit is done in addition to the telescopic gripper pin by means of a conveying element or depositing equipment.

Even though the telescopic gripper pin might be relatively lifted or lowered by making use of corresponding movements of the lifting device at the rack-serving unit itself, the telescopic gripper pin can be either lifted or lowered relative to the lifting device, according to a suitable embodiment, with high performance being required. To this end, an additional lifting mechanism which is able to bear articles can be provided between the lifting device and the telescopic gripper pin. For storing or for removing an article, the lifting device may be oriented in advance with regard to the box bottom. For removing articles, the telescopic gripper pin will be or has been lowered and telescoped below the box bottom opening and then lifted until the article is being lifted from the box bottom, wherein it can transfer the article or the articles by means of the telescopic flanks and/or the telescopic hold-down device from the storing box directly to the load pick-up device. For storing articles, the articles will be lifted onto and by means of the telescopic gripper pin and telescoped in the region of the box bottom opening into the storing box and will then be lowered until the articles rest on the bottom of the box, wherein the article or the articles can be stabilized during such storing process by means of the telescopic flanks and/or the telescopic hold-down device.

An especially suitable embodiment is characterized in that one and the same individual telescopic gripper pin can be telescoped relative to the load pick-up device optionally towards each side and, preferably, when in the retracted state, flushes with about the outer contour of the platform of said load pick-up device so as to not interfere while articles are either being picked-up or delivered to peripheral conveyor equipment. However, it shall not be ruled out by such a concept to provide the lifting device with two inversely operating telescopic gripper pins.

In a suitable embodiment, two telescopic flanks are provided symmetrically to the telescopic gripper pin, which are e.g. synchronously driven together with said telescopic gripper pin and each allow for a stable transport position on the telescopic gripper pin. For handling articles of diverse widths, the flanks can be adjusted transversely with regard to the telescoping direction or are provided with transversely adjustable article supporting elements. The flanks get into contact, either if the telescopic gripper pin is either lifted or lowered or after being lifted or lowered.

Alternatively or additionally, the telescopic hold-down device is provided and either adjustably arranged at the load pick-up device in vertical direction or equipped with at least one article supporting element which is adjustable in the vertical direction. The hold-down device or the article supporting element thereof is conveniently lowered while or after the telescopic gripper pin is lifting so as to be able to pick up one or several articles. When racking up articles, the hold-down device acting on said articles may either remain static while the telescopic gripper pin is being lowered or can also be lowered so as to enable a stable transport position until the articles are positioned onto the bottom of the box.

In a suitable embodiment, two of the belt or band conveyors opposing each other in the load pick-up device respectively form a motion-coupled pair on both sides of the telescopic gripper pin. To this end, a common motion-reversible drive may be provided for the pair, or two coupled motion-reversible drives may be provided for one belt or band conveyor, respectively.

In a suitable embodiment, at least one carrier is provided at the telescopic gripper pin and/or on at least one flank and/or at the hold-down device, which is switchable between an article gripping setting and a passive setting. In the article gripping setting, the carrier prevents articles or packages from slipping beyond the end of the telescopic gripper pin.

In another suitable embodiment, the rest or support for the articles of the telescopic gripper pin and/or the flank and/or the hold-down device are provided with knob structures of a flexible material, preferably at least one knob row of a semi-flexible material. The knob structure may either serve to improve the pressure distribution acting on the articles, in particular between the telescopic gripper pin and the articles, or prevent damages on the articles caused by bruises, and, at the same time, may also severely increase the friction acting on the articles, so that the articles possibly may be either inserted or pulled out even when in contact or in slight contact with the bottom of the box.

In order to diminish the instability of the articles lying on the rest or support, the knob structure, especially that one provided on the telescopic gripper pin, may be flexibly resettable and designed and arranged in such a manner that it occupies a width, when in the off-load state, transversely to the telescoping direction and corresponding to about the width of the rest or support for the articles; however, when in the on-load state, it is switchable to a width distinctly larger than the width of the rest or support for the articles. Even though despite the narrow rest or support for the articles of the telescopic gripper pin articles are supported under load in a slightly more stable manner due to the knob structure, the box bottom opening does not need to be broader than the rest or support for the articles, as the off-load resetting knob structure can easily pass the narrow box bottom opening while the telescopic gripper pin is lowering.

Suitably, the rest or support for the articles has a width, preferably in an end portion and/or an intermediate portion of the multi-part telescopic gripper pin, of just 40 mm to 150 mm, preferentially between 80 mm and 100 mm. Owing to the corresponding width of the box bottom opening, the telescopic gripper pin just needs some millimeters of free space on each side, so that articles of relatively small transverse dimensions can also be stockpiled in a stable manner in the order-picking warehouse.

When the telescopic gripper pin can be either lifted or lowered relatively to the load pick-up device, it is not necessary to move the entire large mass of said load pick-up device to perform such movements but the load pick-up device can be positioned correctly in advance with regard to the box bottom opening. When handling or maneuvering one or more articles with the telescopic gripper pin, the at least one telescopic flank and/or the at least one telescopic hold-down device helps to provide for the stable transport position of the articles on the rest or support for the articles, wherein the flank or the hold-down device is transversely movable with regard to the telescoping direction, respectively. Accordingly, each of the articles is gripped at one go at least in two regions, preferably in three or more regions.

In a suitable embodiment of the order-picking warehouse, the rims of the box bottom opening are about V-shaped and bent downwards in a rounded or angularly chamfered manner. This measure does not only serve to stiffen the box bottom in the region of the rim of the opening but is especially useful when the rest or support for the articles of the telescopic gripper pin is equipped with a flexible structure, such as a knob structure, which takes, when in the off-load state, a smaller width while lowering the telescopic gripper pin, due to the roundings or angles, than in the on-load state.

Another stiffening measure is to bend the corners of the box bottom limiting the box bottom opening downwards. This may be especially useful when the respective storing box is subdivided in several sections in the telescoping direction.

An important characteristic of the order-picking warehouse is that the packages, in particular bottle packages, without loading equipment and of different categories and/or sizes of transverse dimensions that at least correspond to the width of the box bottom opening and each being assisted by the telescopic gripper pin of the at least one flank and/or the at least one hold-down device can be managed without loading equipment.

BRIEF DESCRIPTION OF THE SEVERAL VIEWS OF THE DRAWING

Embodiments of the subject matter of the present disclosure will be explained in the drawings, in which:

FIG. 9 illustrates another handling phase in another embodiment of a rack-serving unit;

FIG. 10 illustrates a handling phase corresponding to that one of FIG. 7 for yet another embodiment of a rack-serving unit;

FIG. 11 is a schematic view of a detailed variant of a storing box; and

FIG. 12 is a front view of the storing box of FIG. 11.

DETAILED DESCRIPTION OF THE PREFERRED EMBODIMENTS

Figure 1:
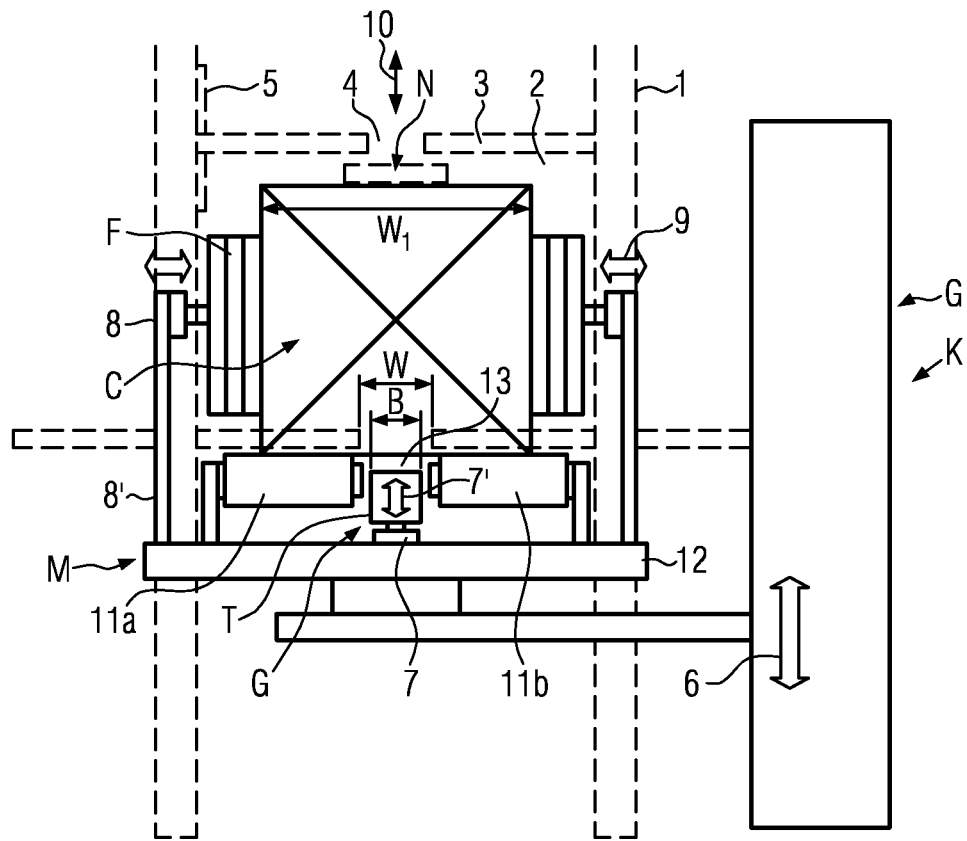
FIG. 1 is a schematic view of an order-picking warehouse comprising at least one storing box and one rack-serving unit while handling e.g. an article.

FIG. 1 illustrates main components of an order-picking warehouse K, for instance in the food or beverage industry, comprising a rack-serving unit G in front of at least one storing box or compartment 2 indicated in broken lines, for instance a high rack, while handling an article C.

The respective storing box 2 is a storing box with open box bottom 3, i.e. two box bottom halves, respectively being fastened to vertical columns 1 and limiting, in about the middle thereof, a box bottom opening 4 in the form of a longitudinal slot and having a width W. Each of these box bottom halves is anchored to at least one vertical column 1, e.g. by means of a side angle bracket 5, and serves to stockpile at least one article C or a plurality of articles C, i.e. each of said storing boxes 2 can be of a depth which corresponds to the ordinary or dual or multiple depth of an article C, wherein the respective article C is of a transverse dimension $W_1$ in the direction of the width, which is larger than the width W of the box bottom opening 4 and is served without loading equipment.

Rack-serving unit G which can be moved, e.g. on the floor, comprises a load pick-up device M which is almost similar to a platform and can be moved up and down at the rack-serving unit G in the direction of a double arrow 6. The load pick-up device M is provided with at least one article transport gripper T which can be telescoped perpendicularly to the drawing plane and can preferably either be lifted or lowered by means of an article-supporting additional lifting mechanism 7 in the direction of a double arrow 7' relative to the load pick-up device M. According to the present disclosure, the article transport gripper T is a telescopic gripper pin D which is preferably arranged at the load pick-up device M in telescopic manner, preferably about in the center thereof and having on top a rest or support 13 for the articles of a width B which is slightly smaller than the width W of the box bottom opening 4.

According to the embodiment of the rack-serving unit G shown in FIG. 1, flanks F, here multi-part flanks, have been applied, e.g. at lateral supporting elements 8', symmetrically with regard to the telescopic gripper pin D and synchronously telescopic with said telescopic gripper pin D, which can be adjusted by means of additional drives 8 in the direction of double arrows 9 transversely to the telescoping direction. Alternatively or additionally to said flanks F, at least one hold-down device N can be provided about above the telescopic gripper pin D, which can either be lifted or lowered in the direction of a double arrow 10. Furthermore, the load pick-up device M is provided with at least one pair of belt or band conveyors 11a, 11b for which either a common direction-reversible drive or two rotary-coupled motion-reversible drives (not shown) are provided for driving said belt or band conveyors 11a, 11b in telescoping direction. The additional lifting mechanism 7 and the belt or band conveyors 11a, 11b as well as the supporting elements 8' (to which, if available, the hold-down device N can be arranged) are arranged at a platform 12 of the load pick-up device M.

The rest or support 13 for the articles of telescopic gripper pin D has a width ranging e.g. between about 40 mm to 150 mm, preferentially between about 80 mm and 100 mm.

Figure 2:
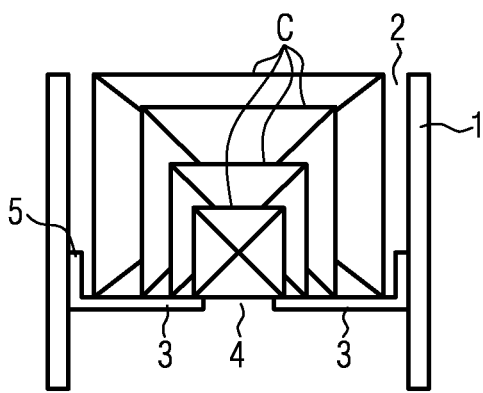
FIG. 2 is a front view of a storing box with open box bottom, with articles or packages of different sizes and/or categories.

FIG. 2 illustrates a storing box 2 including the box bottom 3 formed by the box bottom halves which are anchored to the vertical columns 1 via side angle brackets 5 and restrict the centered box bottom opening 4. A plurality of articles C of different shapes and sizes and categories are indicated or sketched in storing box 2. Box opening 4 is for the telescopic gripper pin. The box bottom opening is as narrow as possible so as to restrict the variety of the shapes and sizes of articles to be stockpiled as little as possible.

Figure 3:
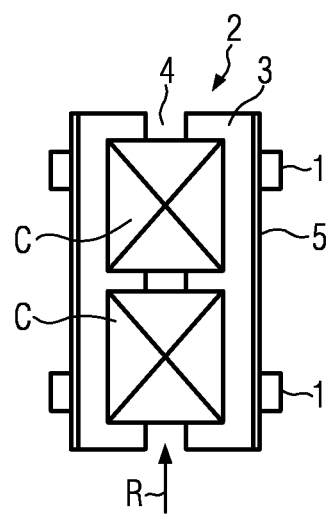
FIG. 3 is a plan view of a storing box with two articles being stockpiled one after the other.

FIG. 3 is a plan view of storing box 2 of a depth corresponding to at least the ordinary depth of two consecutively stockpiled articles C. However, storing box 2 may be of any depth which merely depends on the physical feasibility of the length of telescopic gripper pin D. A telescoping direction of the telescopic gripper pin D and of flanks F or of hold-down device N at one side of load pick-up device M is shown by means of arrow R.

Figure 4:
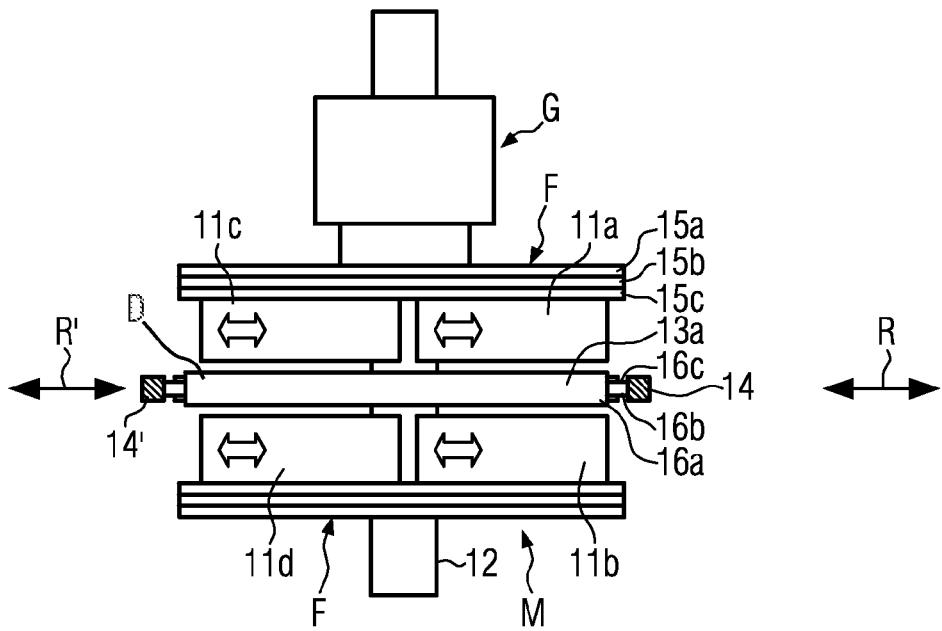
FIG. 4 is a schematic view of a rack-serving unit in a basic position.

FIG. 4 is a plan view of the rack-serving unit G, with the load pick-up device M being in a starting position. The retracted telescopic gripper pin D lines up, as the flanks F do (the hold-down device not being shown), approximately with the contour of the load pick-up device M. The telescopic gripper pin D is positioned in the center of the load pick-up device. The band or belt conveyors (here two pairs 11a, 11b; 11c, 11d) are positioned one after the other in telescoping direction R, respectively, and spaced apart on both sides from the telescopic gripper pin D within flanks F and can be driven independently in pairs, respectively.

The telescopic gripper pin D shown in FIG. 4 can be telescoped towards both sides of the load pick-up device M to optionally serve storing boxes on both sides and includes e.g. a slightly broader main portion 16a, a slightly smaller center portion 16b and an even more smaller end portion 16c, each possibly having article rest portions 13a, 13b, 13c of different widths. The flanks F also include a plurality of portions 15a, 15b, 15c, as well as the possibly or alternatively provided hold-down device N (not shown) (FIG. 1). At the end of at least one end portion 16c, a carrier 14 is provided in FIG. 4 which can be switched between a passive and an article gripping setting. Alternatively or additionally, such switchable carrier 14 may be provided at portion 15c of one or each of said flanks F or of hold-down device N (not shown).

Figure 5:
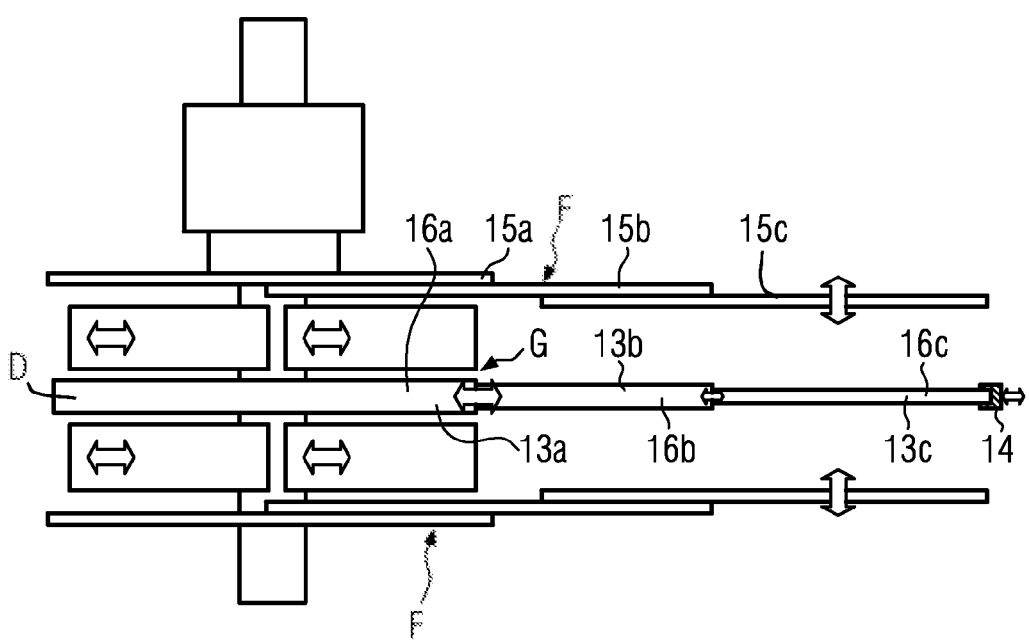
FIG. 5 illustrates the rack-serving unit of FIG. 4 in an article-handling position.

FIG. 5 illustrates the rack-serving unit or the load pick-up device M thereof with the telescopic gripper pin D being extended to its maximum and the flanks F being extended synchronously, wherein at least the portions 15c of flanks F can be adjusted transversely with regard to the telescoping direction in the direction of double arrows 9 or include transversely adjustable article supporting elements (not shown).

Figure 6:
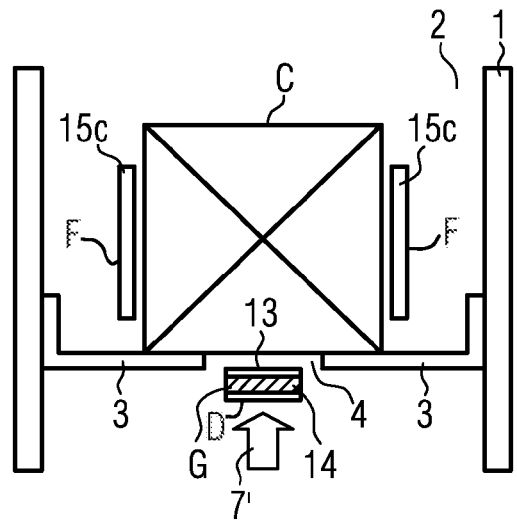
FIG. 6 is a front view of a storing box in a handling phase shortly before a stockpiled article is removed by means of the rack-serving unit.

FIG. 6 shows an article operating or handling phase shortly before an article C is removed from storing box 2 where it had been stockpiled. The telescopic gripper pin D is entirely extended and positioned under the box bottom opening 4. The carrier 14 is in the passive position. Flanks F are also synchronously extended such that the end portions 15c are arranged e.g. on both sides of the side walls of the article C. The telescopic gripper pin D and the flanks F are correspondingly extended to an extend depending on whether or not an article or articles has/have to be unloaded.

In the following operating phase according to FIG. 7, the telescopic gripper pin D is lifted in the direction of the arrow 7' through the box bottom opening 4 so that the article C resting on the rest or support 13 for the articles is gripped in a rather unstable position. Carrier 14 has been switched to the article gripping setting. The end portions 15c of the flanks F are held against the side walls of article C in the direction of arrows 9 so as to ensure the stable transport position of article C on the rest or support 13 for the articles. Alternatively or additionally, the hold-down device N is lowered to the top of article C in order to provide for the stable transport position between the telescopic gripper pin D and the hold-down device N. The article C is lifted from box bottom 3. The telescopic gripper pin D is positioned either in the box bottom opening 4 or above same. Portions 15c of flanks F can be placed against the article C in the transverse direction as soon as the telescopic gripper pin D has conveyed the article to the lifted position according to FIG. 7 or already earlier, wherein in the latter case portions 15c either follow the lifting motion or the side walls of article C move upwards along portions 15c. The telescopic gripper pin D may be controlled independently of the flanks F and/or the down-hold device N.

Figure 7:
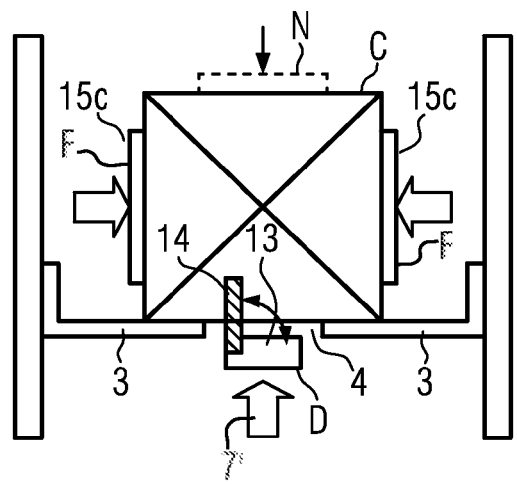
FIG. 7 illustrates a subsequently following handling phase with an article being lifted in the storing box in a stable transport position.
Figure 8:
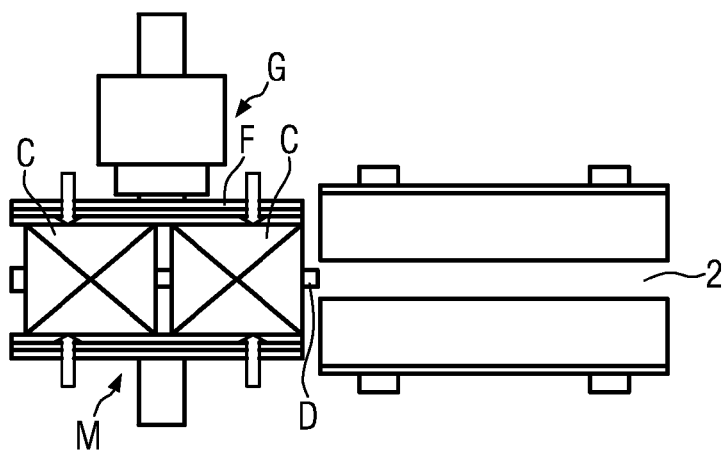
FIG. 8 is a plan view of another subsequently following handling phase with two articles being conveyed from the storing box to the rack-serving unit.

In FIG. 8, the one article C (or two or more articles C) gripped in the stable transport position according to FIG. 7 has been conveyed to the load pick-up device M of the rack-serving unit G by means of the telescopic gripper pin D and the flanks (or the hold-down device N) by retracting. The articles C have been distributed on the load pick-up device M by means of the belt or band conveyors 11a to 11d. Storing box 2, in this case of double article depth, has been cleared. In case the rack-serving unit G is to be moved in the aisle between high racks or in front of a high rack it might be useful to keep the respective article stabilized under pressure of said flanks F and/or said hold-down device N, thus enabling higher accelerations when driving the rack-serving unit G. If need be, the telescopic gripper pin D (and the supports against tilting) may operate or handle a plurality of articles C at a time.

FIG. 9 illustrates another embodiment of the telescopic gripper pin D which is provided on the top of its rest 13 for the articles at least partially with a semi-flexible knob structure 16, which may be convenient, for instance, for improving the distribution of the pressure at article C, for preventing damages to the articles, e.g. due to bruises, and at the same time for strongly increasing the friction to the articles. For instance, according to FIG. 9, there is at least one row of knobs including inner knobs 17 and outer, longer knobs 18. These may have a width, preferably when in the off-load state, which corresponds only to about the width B of rest 13 for the articles. As an additional measure, rims 19 of the box bottom opening 4 here may be bent down or angularly chamfered either in a V-shaped or, as indicated at 20, in a rounded manner. Owing to such measure, not only the stiffness of the box bottom 3 in the region of the box bottom opening 4 has been increased, but the knob structure 16 may also be additionally guided which, according to FIG. 9, broadens at the underside of article C when the telescopic gripper pin D is lifted after having passed the box bottom opening 4 and also helps to stabilize the unstable position of the article C positioned on the rest 13 for the articles of the telescopic gripper pin D to some extent. Yet, the flank portions 15c help to provide for a stable transport position. When in FIG. 9 an article C is conveyed to the storing box 2 and lowered to the box bottom 3, the knobs 17, 18 of the knob structure slightly glide downwards through the box bottom when the telescopic gripper pin D will subsequently be lowered.

FIG. 10 illustrates the knob structure 16 of FIG. 9, which has been deformed to a width B1 under the load of the article C, e.g. when lifting an article C to be unloaded. Such width B1 may be distinctly larger than the width W of the box bottom opening 4. The flanks F (or the hold-down device N which is not shown in FIG. 10) may also be provided with similar e.g. semi-flexible knob structures 16' which serve as article supporting elements and spread up under load, distribute the pressure and increase the friction. Instead of the knob structures 16, 16' different pressure-distributing and/or friction-increasing e.g. flexible elements may be used, primarily to obtain better protection of the articles with regard to bruises or damages.

FIGS. 11 and 12 illustrate a detailed variant of a storing box 2 for an order-picking warehouse K. In this embodiment, the box bottom parts 3 are chamfered downwards at their corners 21 so as to enable angled chamfered flanges 21' provided on the underside and being of about the same height to enter the box bottom opening 4 in a sloped manner. In this case, the storing box 2 is subdivided e.g. in two sections, each corresponding to the depth of an article, i.e. at each vertical column 1 a box bottom part 3 is fixed e.g. by means of a side angle bracket 5 directing upwards. The chamfered flanges 21' are suitably formed by being cut back at each corner so that the chamfered flange 21' is of a continuous height.

The hold-down device N indicated in broken lines in FIGS. 1 and 7 used to establish the stable transport position of the article which has initially been placed on the rest 13 for the articles of the telescopic gripper pin D in a tilting position offers the additional advantage to make maximum use of the storing box over the entire width, as flanks F might be omitted. However, it may be very well conceivable to use both the flanks F and the hold-down device N to assist the telescopic gripper pin D.

Even though in FIGS. 4 and 5 the telescopic gripper pin D can be telescoped to both sides relative to the load pick-up device M, it might be possible to provide an embodiment (not shown) with a separate telescopic gripper pin D on each operating side. This analogously also applies to the hold-down device N and/or the flanks F which can optionally either be extended to each side or can be provided at the load pick-up device M two at a time, respectively.

The respectively used high rack of the order-picking warehouse K here exemplarily is a single-position rack system, i.e. just one single article C can be stockpiled in the transverse direction of each storing box. Despite most different forms of articles or packages, said order-picking warehouse can be served without loading equipment, i.e. without pallets, trays, containers etc. so that no additional conveying technology is required for returning the loading equipment. As the distance between the flanks F may vary, they can be preset to keep the lateral distance to the article C as small as possible, such distance finally being rapidly bridged to set the stable transport position.

The rack-serving unit G can manage a plurality of article forms and categories, e.g. with the most diverse beverage containers. The threshold value is to be seen in the width of the box bottom opening 4. Such articles are, e.g. tetra-packs in a half-open paperboard container of 12, PET-bottle six-packs welded together with a foil, paperboards with wine bottles, PET-bottle packages of 8 2-COKE™ packs on a self-supporting rigid plastic tray as integrated part of the article, FRIDGE MATES™, i.e. longitudinal paperboards with a double row of about 12 beverage cans, conventional returnable beer crates, conventional returnable beverage crates in general, cans or jars of tinned food in an open paperboard carrier as integrated part of the article, or the like.

Stockpiling of articles is not the main function of the order-picking warehouse K but making articles available either separately or, if required, in groups, e.g. for fully automatically order-picking and assorting of mixed pallets. The load pick-up device M with telescopic gripper pin D cannot only be used together with a rack-serving unit G but may be used with most diverse types of robots as for very common industrial robot types, e.g. a portal type, or a SCARA- or buckling arm- or delta-type. The order-picking warehouse K and/or the rack-serving unit G cannot only be used in the food and beverage industry but may also be used for the automatic handling of most diverse objects.

The invention claimed is:

1. A rack-serving unit for high rack order-picking warehouses including article-storing boxes with an open box bottom, comprising a load pick-up device which is generally platform-like and height-adjustable and provided at the rack-serving unit and which includes at least one telescopic transport gripper which can be telescoped substantially horizontally and relative to the rack-serving unit for gripping under at least one article, the transport gripper comprising a single telescopic gripper pin arranged at generally the center of a load pick-up device including a rest for the articles for gripping under the article in an unstable position, for setting a stable transport position for the article being gripped by the telescopic gripper pin the load pick-up device has, at the side of the telescopic gripper pin, at least one telescopic flank which is substantially parallel to the telescoping direction of the telescopic gripper pin, and/or at least one telescopic hold-down device above the telescopic gripper pin, and the load pick-up device includes on both sides of the telescopic gripper pin one or a plurality of parallel belt or band conveyors which can be driven in the telescoping direction of said telescopic gripper pin, respectively.

2. The rack-serving unit according to claim 1, wherein an additional lifting mechanism capable of bearing articles is provided between the load pick-up device and the telescopic gripper pin for lifting and lowering the telescopic gripper pin relative to the load pick-up device.

3. The rack-serving unit according to claim 1, wherein the belt or band conveyors are separated from the telescopic gripper pin by means of lateral spaces and at least two belt or band conveyors are consecutively arranged in the telescoping direction.

4. The rack-serving unit according to claim 1, wherein the telescopic gripper pin is one of extensible or retractable to each side relative to the load pick-up device, and is generally in line, when in the retracted state, with the outer contour of the platform of the load pick-up device.

5. The rack-serving unit according to claim 1, wherein two flanks are provided symmetrically to the telescopic gripper pin and can be one of adjusted at the load pick-up device transversely with regard to the telescoping direction, include transversely adjustable article supporting elements, and a combination thereof.

6. The rack-serving unit according to claim 1, wherein the hold-down device at least one of can be vertically adjusted at the load pick-up device includes at least one vertically adjustable article supporting element.

7. The rack-serving unit according to claim 3, wherein two of the belt or band conveyors in the load pick-up device opposing on both sides of the telescopic gripper pin, respectively form a motion-coupled pair.

8. The rack-serving unit according to claim 1, wherein either the telescopic gripper pin and/or at least one flank and/or the hold-down device is/are provided with at least one carrier switchable between an article gripping setting and a passive setting.

9. The rack-serving unit according to claim 1, wherein at least one of the either rest for the articles of the telescopic gripper pin, the flank, or the hold-down device is/are provided with a knob structure of a flexible material.

10. The rack-serving unit according to claim 9, wherein at least the knob structure provided on the rest for the articles of the telescopic gripper pin is formed in a flexibly resettable manner and arranged such that it takes, when in the off-load state, transverse to the telescoping direction a width which corresponds to about the width of the rest for the articles and can be adapted, when in the on-load state, to a width which is distinctly larger than the width of the rest for the articles.

11. The rack-serving unit according to claim 1, wherein the articles comprise food and beverage industry articles.

12. The rack-serving unit according to claim 1, wherein the parallel belt conveyors comprise band conveyors.

13. An order-picking warehouse comprising racks arranged along rack aisles, and a rack-serving unit according to claim 1.

14. The rack-serving unit of claim 7, wherein the two of the belt or band conveyors forming a motion-coupled pair have either a common, motion-reversible drive or two coupled motion-reversible drives.

15. The rack-serving unit of claim 9, wherein the flexible material includes at least one row of knobs.

\* \* \* \* \*